(12) United States Patent
Parnell et al.

(10) Patent No.: US 7,761,288 B2
(45) Date of Patent: Jul. 20, 2010

(54) POLYLINGUAL SIMULTANEOUS SHIPPING OF SOFTWARE

(75) Inventors: Karen P. Parnell, La Quinta, CA (US); Hans Eric Emanuel Kedefors, Hillsborough, CA (US); Atsushi Kaneko, San Rafael, CA (US); Daniel Salzer, Berkeley, CA (US); Jayant Kulkarni, Sunnyvale, CA (US); Mark Curtis Hastings, Palo Alto, CA (US); Nikolai Tsepalov, Foster City, CA (US); David A Murphy, Galway (IE); Giona Lorenzo Jorge, Galway (IE)

(73) Assignee: Siebel Systems, Inc., San Mateo, CA (US)

( * ) Notice: Subject to any disclaimer, the term of this patent is extended or adjusted under 35 U.S.C. 154(b) by 1322 days.

(21) Appl. No.: 09/845,785

(22) Filed: Apr. 30, 2001

(65) Prior Publication Data

US 2002/0162090 A1  Oct. 31, 2002

(51) Int. Cl.
*G06F 17/28* (2006.01)

(52) U.S. Cl. .................. 704/2; 704/3; 704/4; 704/5; 704/7; 704/8; 715/264; 715/265; 717/101; 717/102; 717/103; 717/120; 717/124

(58) Field of Classification Search ............. 704/2–8; 717/100–103, 120, 124; 715/264, 265
See application file for complete search history.

(56) References Cited

U.S. PATENT DOCUMENTS

| | | | | |
|---|---|---|---|---|
| 5,251,130 A | * | 10/1993 | Andrews et al. ............... 704/3 |
| 5,416,903 A | * | 5/1995 | Malcolm ................... 715/703 |
| 5,572,668 A | * | 11/1996 | See et al. ..................... 714/38 |
| 5,579,223 A | | 11/1996 | Raman | |
| 5,664,206 A | | 9/1997 | Murow et al. | |
| 5,678,039 A | | 10/1997 | Hinks et al. | |
| 5,845,303 A | * | 12/1998 | Templeman ................ 715/517 |
| 5,917,484 A | | 6/1999 | Mullaney | |
| 6,035,121 A | | 3/2000 | Chiu et al. | |
| 6,092,036 A | | 7/2000 | Hamann | |
| 6,185,729 B1 | | 2/2001 | Watanabe et al. | |
| 6,219,632 B1 | | 4/2001 | Schumacher et al. | |
| 6,425,123 B1 | * | 7/2002 | Rojas et al. ................ 717/136 |

(Continued)

FOREIGN PATENT DOCUMENTS

EP  0 668 558 A1  8/1995

(Continued)

OTHER PUBLICATIONS

Rafii et al., Internationalization Software with Concurrent Engineering, IEEE 1995, p. 39-46.*

(Continued)

*Primary Examiner*—David R Hudspeth
*Assistant Examiner*—Lamont M Spooner
(74) *Attorney, Agent, or Firm*—Campbell Stephenson LLP

(57) ABSTRACT

Systems and methods for software development in which the development of a base product proceeds concurrently with the internationalization and localization of the base product to produce multiple language versions of the product for polylingual simultaneous shipment to customers wherein one or more of the multiple languages can be uploaded by the customer in a single installation process.

36 Claims, 4 Drawing Sheets

U.S. PATENT DOCUMENTS

| | | | |
|---|---|---|---|
| 6,442,516 B1 * | 8/2002 | Lee et al. | 704/8 |
| 6,453,462 B1 * | 9/2002 | Meade et al. | 717/124 |
| 6,466,900 B1 * | 10/2002 | Lissauer et al. | 704/7 |
| 6,507,812 B1 * | 1/2003 | Meade et al. | 704/8 |
| 6,629,081 B1 * | 9/2003 | Cornelius et al. | 705/30 |

FOREIGN PATENT DOCUMENTS

| | | |
|---|---|---|
| WO | WO 00/38052 | 6/2000 |
| WO | PCT/US02/10426 | 1/2003 |

OTHER PUBLICATIONS

Yeo, Alvin, "Software Internationalisation and Localisation", Computer-Human Interaction, 1996, Proceedings, Sixth Australian Conference on Hamilton, New Zealand, Nov. 24-27, 1996, p. 348-349.

* cited by examiner

POLYLINGUAL SIMULTANEOUS SHIPPING OF SOFTWARE

TECHNICAL FIELD OF THE INVENTION

The present invention relates to software development, and more particularly to a method of developing software which permits polylingual simultaneous shipping. A base product is developed while concurrently internationalizing and localizing the base product to allow the simultaneous shipment of software with multiple language capability for installation by an end user.

BACKGROUND OF THE INVENTION

As electronic commerce and the international marketplace have continued to expand, international customers of software vendors demand products in their own language, and increasingly, at the same time as the English release. In addition, many large domestic companies have customers distributed throughout the globe, speaking many different languages and operating via a wide variety of infrastructures, local conditions and customs. In order to effectively and efficiently communicate with these customers, multiple language e-commerce solutions are increasingly relied upon to direct and distribute communications between existing or potential customers, and the companies with which they seek to conduct business.

Software development typically proceeds via the writing, testing, and shipment of a single language base version of the product, such as English. After shipment of the English language version of the product, the process of internationalizing and localizing the base product to produce one or more additional language versions of the product is then initiated. This development method ensures that a relatively stable base version of the code is available for the internationalization and localization processes. However, a number of disadvantages are also inherent in such a development method, for example, the sale and/or utilization of the additional language versions of the software is delayed, and obstacles are created in terms of future upgrades for the software via periodic maintenance releases.

Because defects ("bugs") in the base code are invariably discovered and subsequently repaired during the internationalization and localization processes, the resulting various language versions of the product produced via a traditional software development method ultimately differ from the originally released English language version. These differences become increasingly significant as the software developer seeks to prepare and distribute periodic maintenance releases of the product to upgrade its customer's software and to correct deficiencies often discovered through the customer's use of the product.

The preparation and incorporation of periodic maintenance releases of software represents a substantial commitment of resources for a software developer, and is an important feature in the marketing and sale of expensive software applications to end users. The challenge to the software developer when seeking to upgrade a customer application from one version to the next, or to incorporate a maintenance release, is the status of the current software. Where multiple customers have a variety of versions of the same software, the time and costs associated with the preparation and delivery of a maintenance release are significantly increased because the base from which changes are to be implemented is not uniform.

In addition, customers of the English language version of the product also typically discover bugs as they implement use of the software. As these bugs are corrected by the software developer during the lag time associated with the internationalization and localization processes to produce the multi-language versions, the fixes are typically incorporated into the subsequent language versions, compounding the number and complexity of the changes which must be implemented in order to fix bugs discovered during internationalization and localization, thereby creating the potential for further delay in the delivery of the multi-language versions of the software.

BRIEF DESCRIPTION OF THE VARIOUS VIEWS OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Figure 1:
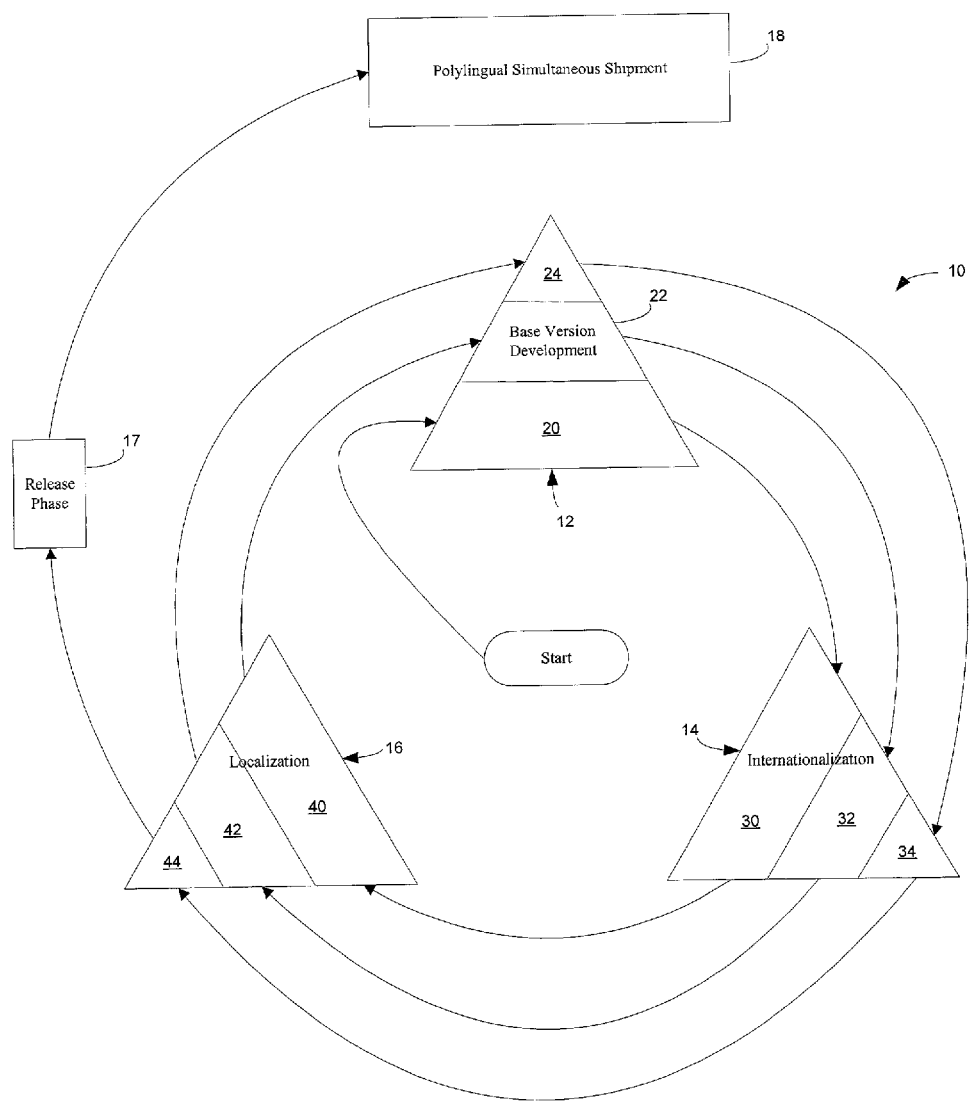
FIG. 1 is a pictorial flow diagram illustrating the interaction between, and the concurrent progression of base version development, internationalization, and localization of a software product for polylingual simultaneous shipment.

The illustrated embodiments of the invention provide a method of software development in which the development of a base product proceeds concurrently with the internationalization and localization of the base product to produce multiple language versions of the product for polylingual simultaneous shipment to customers. In addition, the illustrated embodiments provide a polylingual software product wherein one or more of the multiple languages can be uploaded by the customer in a single installation process, and wherein the installation process itself can be executed in one of the plurality of languages.

Specific objects, advantages, and features of the present invention and the illustrated embodiments will be apparent to the reader from the foregoing and the appended claims, and as the ensuing detailed description and discussion is read in conjunction with the accompanying drawings.

In the following description, numerous specific details are provided to facilitate a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout the specification to "one embodiment" or "an embodiment" a means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

At the outset it should be noted that in addition to the particular elements of the development method described below, one seeking to implement the present method of developing a computer-implemented application may need to incorporate certain basic architectural changes into an existing schema used for the development of a single language version of an application, as referenced previously in the background section of the present disclosure. For example, the efficient development of a multi-language application requires a structuring of the source code such that the language-dependent user interface code ("UI code") may be maintained separately from the non user interface code ("non-UI code"). Developers design an associated UI component to features that are to be implemented, and define UI strings, such that, as development moves forward to implementation of features, the UI component is implemented first. So, for example, where a particular feature is due for completion at code complete #1 (completion of first base stage, defined more filly hereinbelow), the corresponding UI component is finalized at glossary freeze #1 (defined more fully hereinbelow, and corresponding to code complete #1), preceding code complete #1 by a preset period of time designated for the development milestones.

UI code is maintained in a multi-language master repository with all translatable files residing in locale specific directories. The creation of the multi-language master repository for retention of the multiple translations of the UI code, along with all physical schema and business logic, facilitates the process of translating strings, interacting with localization vendors, as well as easing the management of language specific attributes, and allowing the WYSIWYG localization process. The creation of the multi-language master repository, based on a single code page, having one locale table per repository object with support for translatable or locale override attributes, solves the problems of import/export and updates, and allows for a single view on all translatable strings. In an embodiment, a master repository may be generated for each code page, for example, a code page supporting all romance languages, such as English, German, Spanish, French, Italian, and the like, may comprise a single, master repository.

Referring now to the drawings, and in particular to FIG. 1, there is illustrated a pictorial representation of the software development method in accordance with the principles of the present invention generally at 10. While this illustration does not describe the specific interaction between different features of the software development method of the present invention, it does provide a simplified representation of how the overall process proceeds, and should be considered generally in conjunction with the discussion of the subsequent figures which describe systems and methods of the present invention in greater detail. The software development method 10 is comprised generally of three separate, but interconnected development processes: Base version development 12, internationalization 14, and localization 16. A release phase 17 enables the finalization of each of the three preceding processes, and the method 10 culminates in the polylingual simultaneous shipment of the software to customers 18.

While systems and methods of the present invention may typically be facilitated by human beings, the systems and methods of the present invention may be implemented by a computer or an equivalent device capable of executing a set of preprogrammed instructions contained in a computer-readable medium. For example, a server, comprising a microprocessor, a memory, and an input/output section, among other systems components, may be utilized to implement the systems and methods of the present invention. As such, reference throughout this disclosure to individuals, or members of a development team should not be construed to limit the scope of the invention.

The three processes 12, 14, and 16 proceed in a concurrent relationship, whereby, generally speaking, as a stage of each of the processes is completed, the product of that stage is directed to another process for further development, while at the same time, the next stage of the original process is initiated. While illustrated generally in FIG. 1, the interconnection between the three processes is more complex than the illustration indicates. This interconnection is described more fully throughout the following disclosure in connection with FIGS. 2-4.

Internally, each of the processes 12, 14, and 16 comprise a number of distinct steps that may be incorporated into iterative loops that continue throughout the development process 10 as the code is written, internationalized, and translated by local partners working in conjunction with members of the software development team. For example, each of the three processes 12, 14, and 16 is broken into three distinct sections for purposes of illustrating the present embodiment, although the number of steps will, in practice, be a function of the complexity and scale of the development method 10 as a whole. The base version development process 12 comprises a first base stage 20, a second base stage 22, and a third base stage 24. The internationalization process 14 comprises a first international stage 30, a second international stage 32, and a third international stage 34, and the localization process 16 comprises a first local stage 40, a second local stage 42, and a third local stage 44. Each of these stages represents the development and completion of a portion or percentage of the software under development via the method of the present invention, and will be defined more fully throughout the following discussion in conjunction with FIGS. 2-4.

One skilled in the art will understand that the development of a software application generally consists of the development of a number of elements, including: (1) a front end comprising a user interface which defines how the user interacts with the software application; (2) a middle comprising the software code itself which defines the flow of information through the application from and to points of input, process, and output; and (3) a data model which consists of databases, tables, columns, domains and the like that make the application functional. An important aspect of the present invention is the distinction between UI code, which defines the front end of the application and how the user interacts with the application, and non-UI code, which defines the middle of the application and provides a communication path to and from the functional back end of the application to provide functionality to the user interface. In the development of multiple language versions of the application, the UI code must be translated via a localization process while the application as a whole is reviewed and tested via the internationalization process to ensure compatibility with a variety of locales. Translation comprises not only a conversion from one language to another, but many other potential changes as well, for example, changes to color, address layout, and the like. The reader will appreciate that not all UI code is necessarily translated in this process.

A number of milestones, defining a beginning, a completion, or a significant event in the development method 10 are discussed herein in conjunction with each of the three processes 12, 14, and 16. These milestones represent important project checkpoints which may define the schedule of the project, and allow the software development team to evaluate or re-evaluate the timelines to completion of the project, or to the initiation of various steps or stages of the development process 10 as it is being undertaken.

The software development method 10 begins with base version development in the first base stage 20, which, for purposes of illustrating an embodiment of the present invention, corresponds to a first code complete milestone tied to the development of approximately 60% of the UI code. The first code complete milestone is defined by the completion of the software code (the middle of the application) corresponding to the 60% UI code for features and functionality to be implemented by completion of this stage. The second base stage 22 may be defined by a second code complete milestone corresponding to the development of approximately 80% of the UI code, and the third base stage 24 may be defined by the development of approximately 100% of the UI code. These percentages are arbitrary, and the actual number of such theoretical stages may differ with the particular requirements of an application under development.

Following completion of the first base stage 20 of the software development method 10, internationalization 14, via a first international stage 30, and localization 16, via the first local stage 40, are initiated and proceed for the code produced in first base stage 20. Concurrently, the second base stage 22 is initiated, further developing the base version code, and implementing any fixes and/or changes for bugs discovered during the internationalization 14 and localization 16 of the code generated by the first base stage 20. The method 10 may be implemented such that as the internationalization 14 and localization 16 of the first base stage code is completed, the second base stage 22 is also completed, and the concurrent development process proceeds effectively in the manner illustrated in FIG. 1.

Following internationalization 14 and localization 16 of the third base stage code, a release phase 17 is entered which culminates in a finished software product ready for polylingual simultaneous shipment 18 to customers. The release phase 17 begins at a point when the translation of the UI code has been substantially completed. The release phase 17 comprises an iterative process of identifying bugs in the application, fixing the identified bugs, and re-building the application for further testing to identify additional, or remaining bugs. Attention is drawn to the fact that the percentage or amount of development at each stage of the processes described above need not be fixed, nor need any definitive percentage of the total be accomplished before proceeding with the next successive step in the software development process. The percentages used to describe the present embodiment are intended only to illustrate an approach to the development method 10, and should not be construed to limit the scope of the invention.

Having observed the details of the general interaction and relationship between the three concurrent development processes 12, 14, and 16, attention may now be given to the specific details and steps of each individual process, and to the specific interrelationships among them. At this point, it should be noted that the grouping of particular steps together under the heading of one of the three particular processes described above in conjunction with FIG. 1 is for illustrative purposes only, and in practice, the software development method 10 of the present invention may proceed without such categorization.

Figure 2:
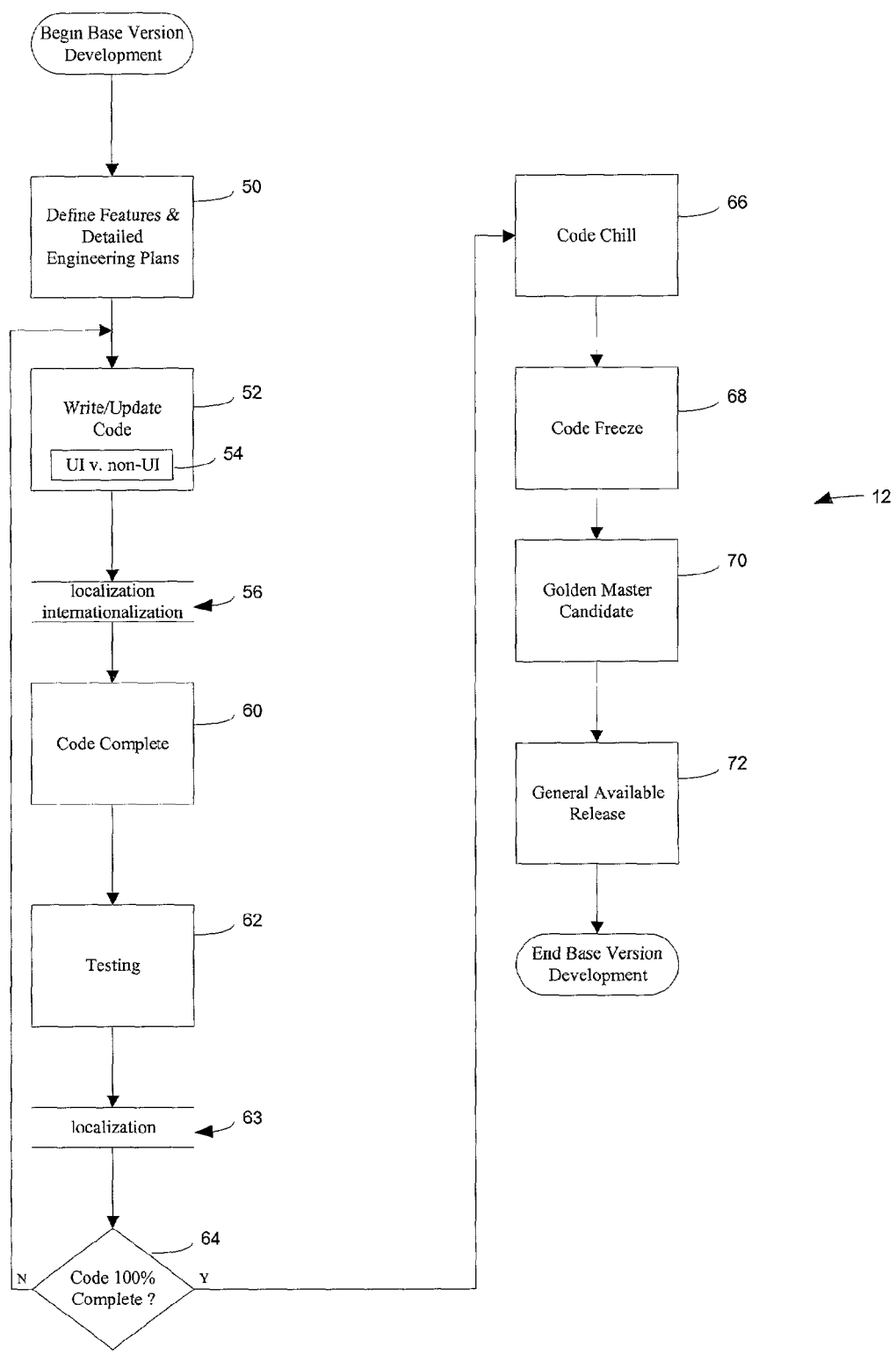
FIG. 2 is a schematic flow diagram generally illustrating the base version development process.

Referring now primarily to FIG. 2, the base version development process 12 is illustrated generally via a schematic flow diagram. The base version development process 12 begins with a process of defining features of the software application to be developed 50. Engineering managers begin, at this point, to create a detailed engineering plan that defines specific feature functionality, and code issues, as well as third party dependencies and issues. The process of defining features, or specific feature functionality, of the software will be understood by those skilled in the art to be the process of determining which new features are to be added or implemented in the new version release for which the development method of the present invention will be undertaken. For example, a software development team may generate a release defining features list that provides a definitive overview of the necessary components and functionality of the software development project. The list does not define specific coding, but rather a high level overview of the application's functionality. Similarly, a detailed design specification or engineering plan may be generated to outline a blueprint of how the software development team intends to develop the project, in many cases providing step-by-step information on how the development team intends to implement the functional specifications. The detailed design specification may include information such as which third party software will be utilized with the application. For example, a report generating application, which may be part of a larger database management application, may be utilized to handle reporting functionality in the application under development. A report generator is typically employed to select specific record fields, or ranges of records, and to make the output attractive by including features such as headings, page numbers, and fonts. Code issues refers to limitations regarding feature functionality, for example, a feature of the application that does not support multi-byte character sets, or operating system/database limitations.

Defining the features and developing engineering plans to implement those features 50 also includes a selection of development milestones, as discussed previously, and a determination of which features are to be implemented and included at each of the development milestones. Each milestone defines the completion of some portion of a stage of the individual processes 12, 14, and 16 described above, and may be tied to one or more stages or individual steps of the other two concurrent processes. As examples of development milestones, the code complete milestones discussed above in conjunction with FIG. 1 are representative. Each code complete milestone corresponds to a point in the development process when a percentage of the application, or a defined number of features have been coded and unit tested. This milestone defines a point from which additional steps in the stages of the concurrently progressing development processes 12, 14, and 16 may be initiated, or have been successfully completed.

Base version development 12 next proceeds with the writing of new code and/or the updating of the code from a previous version of the software 52. The reader will appreciate that a prior version of the code will not always be available upon which to base the development of a new version for polylingual simultaneous shipment, for example, when a feature is completely new to the release currently under development. However, where a prior version does exist, updating the code from a previous version will include the globalization of the product to make it generic. The process of making the product generic involves the removal of icons, colors, or other attributes of the user interface which may be inappropriate in one or more of the locales for which the product will ultimately be translated. The specific attributes may then be reintroduced, altered, added, or changed to fit the particular locale during the localization process 16 which will be discussed more fully hereinbelow.

The base version development process 12 generally comprises development of a version of the application in a base language, for example, English. This base language version of the application will then be translated into one or more additional languages by the localization process 16, such as, for example: German; Spanish; French; Japanese; Danish; Dutch; Italian; Portuguese; Swedish; Chinese; Korean; Czech; Finnish; Greek; Hebrew; or any other language for which a market demand exists for the application. Translation of the base language version of the application also comprises translation of the base language locale, as mentioned previously, in regard to other attributes of the user interface. As mentioned previously, an important aspect of writing and/or updating the code in regard to the software development method of the present invention is the differentiation between UI code and non-UI code 54. UI code generally refers to language dependant code such as error messages, menus, dialog titles, and text used in applets and views throughout the software, and which will vary depending on the particular language with which the non-UI code is implemented.

In an embodiment, eighty to ninety percent of the UI code will be maintained in the repository, while the remaining ten to twenty percent will be located in resource files. One skilled in the art will understand that a resource file will typically comprise resource data, including data structures, templates, definition procedures, management routines, icon maps, and the like, associated with a particular resource, such as a menu, window, or dialog box, as well as a resource map indexing the data. Because the resource item of data or code may be utilized by more than one program, or in more than one place in a program, such as a dialog box, or the like, maintaining a portion of the UI code in resource files, as opposed to the repository, permits features of the application to be altered or added more efficiently. Non-UI code refers generally to the underlying programming code that defines the functionality of the software program itself, and may take the form of any number of programming languages such as, for example, C++. In effect, the base language of the UI code represents an additional language version of the software, and is no different from any other language into which it will ultimately be translated. The non-UI code exists independently from the UI code as a generic entity that need not be translated. As a programmer designs a feature or feature subset of the application, he or she enters the UI code into the repository, or as part of a resource file.

As the programming of a defined percentage of the UI code is completed, corresponding to one of the base stages of the base development process 12, e.g., 60% for the first base stage 20, the completed UI code is directed to the localization process 16 at step 56 wherein a base glossary will be generated and ultimately translated by local partners working in association with members of the software development team. The localization process 16 will be discussed in greater detail below. As this process is being undertaken, the non-UI code being developed concurrently is directed, at step 56, to the internationalization process 14 for feature review and unit testing. These steps will also be discussed in greater detail below in conjunction with the internationalization process 14. The translated glossary, and the feature reviewed and unit tested code are then returned to the base version development process 12 culminating with a code complete milestone 60 defined as the completion of specific features, intended to be implemented at this particular stage, having been coded, checked-in, and unit tested.

As each feature passes the code complete 60 milestone, it is passed on to testing 62. At this stage of the base version development, the currently existing product is tested before features are integrated into the main codeline. Testing 62 may include basic integration testing, engineering acceptance testing, and functional acceptance testing.

Basic integration testing comprises testing the interaction of newly combined modules of the application that have already been individually tested via the unit testing process (part of the internationalization process 14). The objective of performing basic integration testing is to determine how well the individual modules work together as a system and that the modules continue to function correctly on an individual basis when combined with other modules. Those skilled in the art will understand that basic integration testing is performed on a build of the currently existing application following the code complete milestone 60.

Engineering acceptance testing comprises testing after unit testing and integration testing have been completed, and is designed generally to demonstrate that functions and features of the application are available as specified by the documentation defining the milestones, and the application features to be implemented at the point in the development process when this testing occurs. Engineering acceptance testing ensures that identified classes of valid input are accepted by the application, identified classes of invalid input are rejected by the application, identified functions are being executed by the application, identified classes of application outputs are functioning properly, and all interfacing systems or procedures are being invoked.

Functional acceptance testing comprises testing the entire integrated existing application to ensure known and predictable results. Functional acceptance testing simulates live conditions, although with structured and scripted tests.

In addition to the testing described above, a number of other testing scenarios may be utilized and undertaken to verify particular attributes or features of the application, including, for example, performance testing, regression testing, and the like.

Following testing 62, the base version code is again directed to the localization process 16 (see step 63) where a localization kit is generated for the local partners working in conjunction with the software development team. The localization kit generally consists of the existing translated glossary containing those words, strings, and other UI code that provides a language-specific user interaction, and the most current build of the application incorporating those features tied to the preceding code complete 60 milestone. The localization kit will be discussed in greater detail below in conjunction with the localization process 16.

Where the features of the software application defined at step 50 is not yet 100% coded (see step 64), a subsequent base stage, in this case the second base stage 22, is initiated and the process 12 repeats itself beginning at step 52. The remaining steps in the schematic flow diagram of FIG. 2 illustrate the resolution of the development process 10 corresponding to the release phase 17 (see FIG. 1), following 100% coding of the application features, but prior to polylingual simultaneous shipment 18 of the software to customers. These processes will be discussed in greater detail hereinbelow following a discussion of the internationalization and localization processes.

Figure 3:
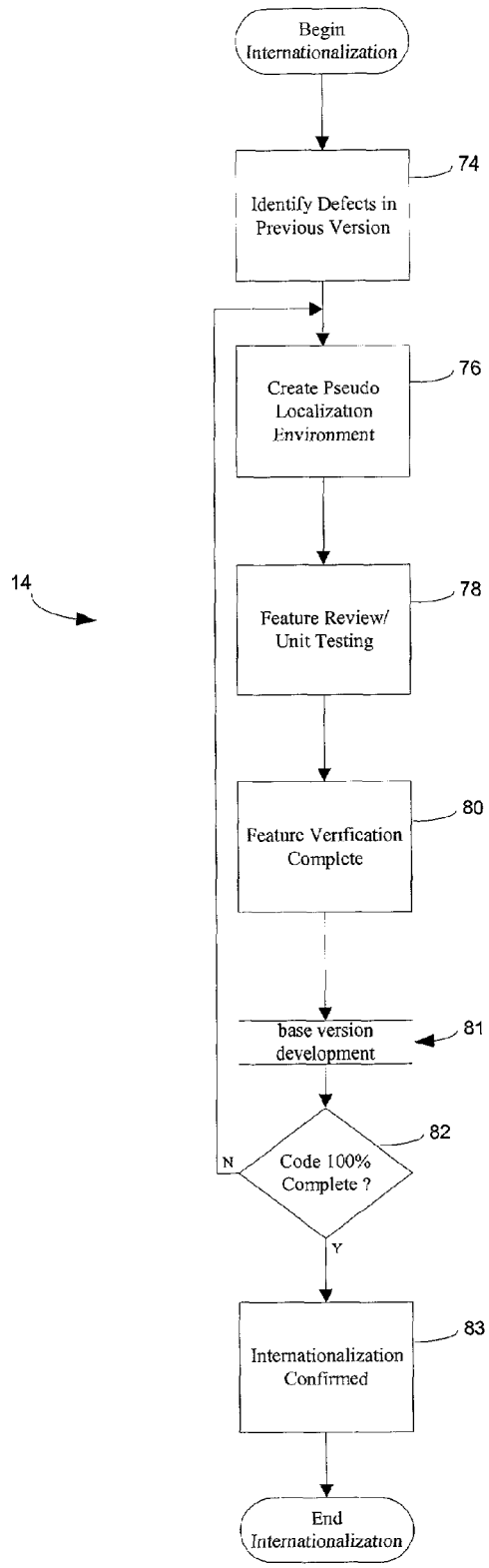
FIG. 3 is a schematic flow diagram generally illustrating the internationalization process.

Turning our attention now primarily to FIG. 3, the internationalization process 14 is illustrated as a schematic flow diagram which begins with the identification of defects in a previous version of the software 74 on which the new release is to be based. This step is essentially the identification of internationalization bugs existing in a previous release that may be particularly problematic in terms of localization. For example, existing features from a previously released version of the application may be reviewed for functionality problems caused by third party software being utilized in conjunction with the application, or for date, time and/or currency format problems that may impede functionality and/or localization of those features for the current polylingual release. In addition, there may be defects from a previous release which have been deferred because of relatively low priority or technical difficulty. The reader will appreciate that a previous version will not always be available, and in such instances, this part of the process may be disregarded. This step 74 may be undertaken concurrently with the initiation of base version development so that any preliminarily identified defects may be corrected in the first base stage 20 (see FIG. 1) of the base version development 12. After identifying internationalization bugs, the software development team may utilize a defect tracking tool to log, quantify, and manage the bugs. In effect, such a tracking tool is a database in which one catalogs bugs and maintains the status of fixes for the identified bugs.

Internationalization itself is generally responsible for ensuring that the software application is truly "internationalized" and therefore capable of being localized in a variety of locales. The internationalization process 14 is therefore concerned primarily with: Discovering any and all hard-coded strings, each of which would impede localization to an alternate language-specific interaction; verifying support for all date, time and currency formats; and verifying multi-byte character support for pictorially based languages. The identification and fixing of hard-coded strings is discussed in greater detail in the following section in conjunction with the creation of a pseudo localization environment.

Verification of support for all date, time, and currency formats comprises a confirmation that each locale dependant format (e.g., date, time, and currency) corresponds to the analogous format in the operating system on which the application will be running. For example, if the application will be run on a Windows 2000® operating system, the verification process includes changing the regional (locale) setting from the base language setting, for example, English, to an alternate setting for the locale, for example, Japanese; running the application; and, confirming that each locale dependent format corresponds to the operating system's locale format.

Verification of multi-byte character support comprises a confirmation that multibyte character strings (strings comprised of pictorially represented characters), entered via a testing process implemented for the application, are correctly stored in a corresponding application server, and are accessible from a client side of the application. Multi-byte character support is undertaken by the chosen operating system's application programming interface that directs the performance of procedures by the operating system. Verification includes changing the regional (locale) setting from the base language setting to an alternate language setting corresponding to a pictorially-represented character set; running the application along with the application server; entering multi-byte character strings; and, confirming that those entered strings are correctly stored, and accessible, as mentioned previously.

Following identification of defects in a previous release of the software application 74, the next step in the internationalization process 14, which may be considered the initiation of the first international stage 30 (see FIG. 1), is the creation of a pseudo localization environment 76.

Pseudo localization comprises a process of simulating localization by adding prefix characters to all translatable strings in the application, and altering any locale-specific setting in the operating environment, e.g., date, time, number, currency format, or the like. Pseudo localization may be utilized for international testing prior to having the true translation available. A pseudo localization build of the application is treated as just another language version of the UI code. The pseudo localization build may be designed to automatically perform the actual pseudo translation by modifying translatable base language strings to incorporate the prefix mentioned above.

The pseudo localization environment allows the internationalization process 14 to identify any and all hard-coded strings in the source code or bitmaps by simulating localization of the code. In addition, the pseudo localization environment facilitates the identification of hard-coded formats, such as time, date, and currency symbol placement, as well as hard-coded references to translations, among other things. The simulation is carried out by adding prefix characters to all translatable strings in the product. Similarly, other internationalization bugs are identified and corrected. Those strings not carrying the prefix following pseudo localization are identified as hard-coded (not located in a translatable file) so that they may be replaced in the next stage of base version development 12 to ensure complete and effective localization of the product. In addition, because the pseudo-translated strings require additional space to fit within the user interface, pseudo translation gives a first indication as to whether the user interface is designed sufficiently to incorporate the actual translation of the UI code, which may also require additional space. These resizing issues will be addressed in more detail during a discussion of the localization process 16.

Following pseudo localization 76, the internationalization process 14 proceeds with feature review and unit testing 78. Feature review comprises of an analysis of existing features of the application in regard to internationalization issues, for example, are there specific design or architectural issues with regard to a feature that may impede functionality and/or effective localization. Internationalization team members then work with base development team engineers to solve those problems, or re-architect the design to avoid the problems. Unit testing comprises isolated testing of each flow path of code within each module encompassing one or more features of the software application to ensure that each unique path of a module performs accurately to the documented specifications, and contains clearly defined inputs and expected results. Unit testing works in conjunction with feature review to facilitate a determination of whether the existing application contains major design or functional defects as measured against specification documents, such as the release defining features list discussed previously in conjunction with step 50 of FIG. 2. In addition, feature review/unit testing 78 provides a means of determining when the existing application is ready to move into integration testing, and other testing, following the code complete milestone 60 (see, e.g., FIG. 2), as well as whether the existing application functions correctly in the test environments, such as network, hardware, operating system, relational database management system, or the like, that are necessary for the potential customer base.

The feature verification complete 80 milestone corresponds to a point in the software development process 10 when all current features have been reviewed and unit tested, and signals a return to the base version development process 12 at step 81 for code complete 60 (see FIG. 2), testing 62, and communication with the localization process 16 (see step 63) for generation of a localization kit. The feature verification complete milestone 80 is analogous to the code complete milestone 60 of the base version development process 12, and signifies a point in the software development method 10 wherein additional stages and/or steps may be initialized.

Where the features defined at step 50 (see FIG. 2) are not 100% coded (see step 82), the internationalization process 14 is repeated, beginning at step 76, for the product of the second base stage 22 (see FIG. 1) of base version development process 12, and subsequently for the product of the third base stage 24 of the base version development process 12, as illustrated in FIG. 1. Where the features are substantially 100% complete (as determined at step 82), an internationalization confirmed milestone 83 is reached, defining a point in the software development process 10 at which all defined features have completed feature review and unit testing, and all internationalization defects have been identified and ideally fixed.

Figure 4:
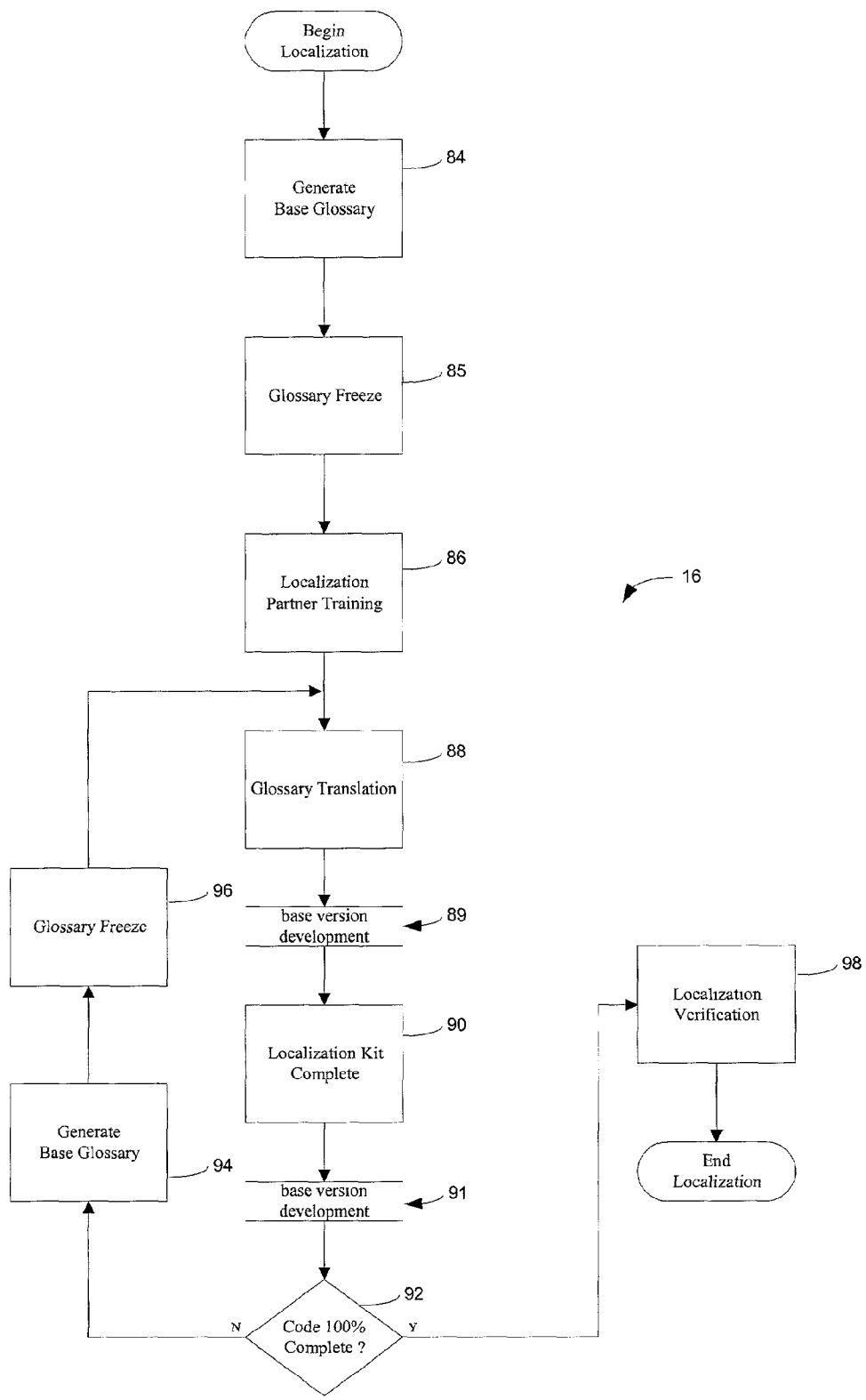
FIG. 4 is a schematic flow diagram generally illustrating the localization process.

Referring now primarily to FIG. 4, the localization process 16 is illustrated generally via a schematic flow diagram. The localization process 16 begins with the generation of a base glossary 84. The process of generating a base glossary 84 is undertaken following the completion of a defined percentage of the UI code in the base version development process 12, and direction of that UI code to the localization process 16 via step 56. The generation of a base glossary 84, containing those words, strings, and other UI code which will need to be translated in order to provide a language-specific user interaction, provides a starting point for the localization of the software application being developed. The base glossary is generated based on the existing UI code corresponding to the defined features of the software application that are to be implemented at the corresponding code complete 60 milestone in the base version development process 12 corresponding to any one particular base stage 20, 22, or 24. The base glossary may be generated 84 by utilizing a glossary tool and a database engine to produce a list of all base language strings. If a previous version of the application exists, the user may wish to exclude terms from the previous release that have previously been translated by comparing the newly generated list of base language strings with a previous version list.

Glossary generation 84 ties to a glossary freeze 85 milestone, and to the corresponding code complete 60 milestone in the base version development process 12. The glossary freeze 85 will precede the code complete 60 by a period of time, e.g. two weeks, to provide time for the generation, translation, and review of the glossary prior to transmittal of a corresponding localization kit to local partners.

It is not critical that any definitive percentage of the base version be completed at the point at which the base glossary is generated 84, however, generation of the base glossary 84 does require a stable running version of the software application commonly referred to as a glossary kit build. In addition, the local partners will require a stable running version of the application in order to verify translations based on the context of the translated term in the software application when the localization kits are distributed. Consequently, completion of the first base stage 20 (see FIG. 1) may equate with development of approximately 60% of the total code in the software application in an embodiment.

Following generation of a base glossary 84 and the glossary freeze 85 in the first instance, local partner training 86 is undertaken, wherein partners from each locale who will do the actual translation of the UI code into the various language versions are trained and given demonstrations of the procedures and tools necessary to carry out the translation process. Local partners are trained on all aspects of the application from a localization perspective, including a review of localization and engineering processes, localization kit structure, documentation procedures, and a review of the repository and build structures/processes, as well as a description of how the localization process 16 will be structured, including project timelines.

The UI code corresponding to the generation of a first base glossary, via step 84, will be implemented at or before glossary freeze 85, although the corresponding non-UI code defining the corresponding features of the application is not necessarily completely implemented until the code complete 60 milestone. The reader will appreciate that as additional features are added via base version development 12 in subsequent base stages, the glossary will expand to encompass new UI code tied to the new features and corresponding non-UI code, and translations will be able to proceed accordingly on a newly updated stable version of the application. Each update of the base glossary will be based on the previous base glossary so the translations at each stage of the localization process 16 are maintained, but may be changed if necessary. Two methods may be implemented for creating and/or modifying locale entries in the repository: Logging onto the repository database in locale mode, e.g., German, checking out a project from the repository, and editing an applet; or, utilizing a locale management utility for importing or exporting string data to and from repository tables.

Following local partner training 86, the localization process 16 proceeds with the UI code translation, which is the heart of the localization process. UI code translation may be defined as two separate parts, a glossary translation 88, and a localization kit completion 90. The glossary translation 88 takes place prior to the receipt of the localization kit, and forms the foundation for all terminology used by the localization partners in completing the corresponding localization kit. The glossary translation 88 takes place following the glossary freeze 58 (see FIG. 2) as the existing base glossary is directed to the localization process 16 from the base version development process 12 at step 56. The glossary freeze 85 is a milestone corresponding to a point in the development process 10 when a defined portion of the UI code has been implemented and a base glossary has been generated. At some point, a definitive, static, glossary must be available for translation, and this is defined by the glossary freeze milestone 85. As the software development 10 proceeds to completion, each glossary freeze 85 is followed by a code complete 60 such that the current base glossary can be translated in context with the corresponding functional aspects of the software application. The generated base glossary may be translated simply by translating each base language string, identified in the glossary, into its equivalent in the specific locale language.

At this point in the localization process 16, the translated glossary is returned to the base version development process 12 for code complete 60 and testing 62. Following code complete 60 and testing 62 in the first base stage 20 of the base version development process 12, and the first international stage 30 of the internationalization process 14, the existing application is directed to the first local stage 40 (see FIG. 1) for generation of a first localization kit, including the existing translated base glossary and a build of the application including all currently existing features, and wherein localization kit completion 90 takes place.

Localization kit completion 90 consists of a translation of all remaining UI code based on the existing translated base glossary, verifying translations in the context of the application, resizing of the user interface to accommodate translated strings where necessary, and identification of any localization bugs. Localization kits are generated following each code complete milestone, and after the currently existing features have been incorporated into a build. The process for generating a localization kit comprises pulling together all translatable strings, whether from the repository, or from resource files. After the initial localization kit is generated, an engineering team performs a comparison of the base language files and/or strings with the previous version, if any, of the application, and identifies all new or changed strings. This comparison process may be performed using the locale management utility mentioned above.

While each localization partner may conduct the localization kit completion 90 in a slightly different manner, an example process may comprise breaking the existing application into smaller modules to be passed to translators, followed by a review of translated strings, and resizing of, for example, dialog boxes, if necessary, to contain the translated strings. At this point, the translated localization kit is returned 91 to the base version development process 12 for integration into a main, multi-language repository that contains the UI code in each of the plurality of languages into which the base language has been translated. As with the base version development and internationalization processes 12, 14, respectively, where the defined features are not yet 100% complete (see step 92), the localization process 16 is repeated beginning at step 88. The iterative loop also incorporates steps for the generation of a base glossary and a glossary freeze (94 and 96 respectively). These steps have been designated separately from steps 84 and 85 because the glossary generation and freezing, at this point, will be based on the glossary existing from a previous local stage.

As each local stage is completed, the translated UI code is incorporated into the multi-language repository from which a repository file can be created. The repository file is an object file generated by compiling all the entities in the repository. An object compiler may then insert the appropriate message text from a message table into the repository file depending upon the language for which the repository file is compiled. The object compiler maps the appropriate message text from the message table to the specific object in the repository, and the repository file is thus specific to a particular language for which it is generated.

When the code is substantially 100% complete (per step 92), the localization process 16 proceeds to the localization verification step 98 wherein the developed application is reviewed for aesthetic and linguistic issues.

As the base version development, internationalization, and localization processes 12, 14, 16 cycle through the iterative loops with each stage of the development process 10, the preceding interaction is repeated until the code has been 100% implemented for the defined features, and the corresponding user interface. At this point, internationalization is confirmed 83 (see FIG. 3), localization verification 98 has been completed, and base version development proceeds to step 66, known as code chill. Code chill 66 signifies the point in the development process wherein the defined features of the application and user interface have been completely coded, and wherein the final fixes from the third international stage 34 and the third local stage 44 (see FIG. 1) are incorporated into the base version product main codeline.

Following code chill 66, base version development 12 proceeds to code freeze 68. Code freeze 68 signifies a milestone at which point the main codeline of the software version under development is locked, and all P0 and P1 bugs have been identified and fixed, or deferred. Any changes at this point require exception approval so as to prevent accidental modification or addition.

Following code freeze 68, a golden master candidate is built 70 and tested, and a generally accepted release 72 completes the development of the software application for polylingual simultaneous shipment to customers.

As part of the single, multiple-language build of the application for polylingual simultaneous shipment, a multi-lingual installation process enables users of the application to run the installer in any one of the multiple languages, and to have the capability of installing and running one or more of the plurality of languages included as part of the polylingual simultaneous shipment. For example, a customer could launch the application installer and decide they want to install the English language product, while at the same time deciding that they want the installer to perform the installation in Italian. The ability to install a plurality of languages may be subject to the terms of a license agreement between the software vendor and the end user of the application.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method comprising:
   developing a base version of a computer-implemented application in a base language, wherein
      the base version of the application comprises language dependant code and language independent code,
      the developing the base version of the application comprises developing a plurality of stages of the base version of the application, and
      the plurality of stages of the base version of the application comprises a first stage, a second stage, and a third stage;
   facilitating an internationalization of the base version of the application, wherein
      the internationalization of the base version of the application comprises pseudo localization of the language dependent code of the base version of the application,
      the internationalization of the base version of the application comprises an internationalization of the second stage, and
      the internationalization of the second stage is performed concurrently with the developing of the third stage; and
   facilitating, using a processor, a localization of the base version of the application, wherein
      the localization comprises generating a base glossary, and
      the localization of the base version of the application comprises a localization of the first stage, and
      the localization of the first stage is performed concurrently with the internationalization of the second stage; and
      storing a localized version of the first stage in a memory.

2. The method of claim 1 wherein developing the base version of the application comprises:
   identifying all language dependent user interface code in the base version of the application; and
   creating a source code structure for the application wherein the language dependent user interface code is maintained separately from non user interface code.

3. The method of claim 1 wherein the base language is English.

4. The method of claim 1 wherein pseudo localization includes adding a prefix to each translatable string in the application.

5. The method of claim 4 wherein the pseudo localization further comprises altering locale-specific settings in an operating environment.

6. The method of claim 5 wherein the locale-specific settings comprise at least one of a date, a time, a number, a currency format and a hard-coded reference to a translation.

7. The method of claim 4 wherein the pseudo localization further comprises identifying hard-coded strings in the application by simulating localization of the application.

8. The method of claim 1 wherein the at least one language different from the base language is selected from the group consisting of: German, Spanish, French, Japanese, Danish, Dutch, Italian, Portuguese, Swedish, Chinese, Korean, Czech, Finnish, Greek, and Hebrew.

9. The method of claim 1 wherein the application comprises a front end, a middle, and a data model, wherein the front end comprises user interface code developed in a base language and the middle comprises non user interface code developed in a programming language.

10. The method of claim 1 wherein a first portion of the language dependent code is stored in a master repository and a second portion of the language dependent code is stored in resource files.

11. The method of claim 1 wherein the internationalization of the base version of the application further comprises identifying defects in a previous version of the application.

12. The method of claim 1 wherein generating the base glossary comprises creating a list of base language strings.

13. The method of claim 1 wherein the localization of the base version of the application comprises a localization of the second stage concurrently with an internationalization of the third stage.

14. The method of claim 1 wherein the internationalization of the base version of the application comprises adapting the base version of the application to be capable of being localized in a variety of locales.

15. The method of claim 1 wherein the base glossary comprises a glossary for the language dependent code, translated into at least one language different from the base language.

16. The method of claim 1 wherein the language dependant code of the base version of the application is stored separately from the language independent code of the base version of the application.

17. The method of claim 1 further comprising:
    modifying the base version of the application, wherein the modifying is performed in response to at least one of: the internationalization of the base version of the application or the localization of the base version of the application.

18. The method of claim 1 further comprising:
    providing the localized version of the first stage for testing using an input/output device.

19. An article of manufacture, comprising a computer-readable storage medium encoded with instructions that, if executed by a processor, will cause the processor to perform operations comprising:
    developing a base version of a computer-implemented application in a base language, wherein
        the base version of the application comprises language dependant code and language independent code,
        the developing the base version of the application comprises developing a plurality of stages of the base version of the application, and
        the plurality of stages of the base version of the application comprises a first stage, a second stage, and a third stage;
    facilitating an internationalization of the base version of the application, wherein
        the internationalization of the base version of the application comprises pseudo localization of the language dependent code of the base version of the application,
        the internationalization of the base version of the application comprises an internationalization of the second stage, and
        the internationalization of the second stage is performed concurrently with the developing of the third stage; and
    facilitating a localization of the base version of the application, wherein
        the localization comprises generating a base glossary,
        the localization of the base version of the application comprises a localization of the first stage, and
        the localization of the first stage is performed concurrently with the internationalization of the second stage.

20. The article of manufacture of claim 19 wherein developing the base version of the application comprises:
    identifying all user interface code in the base version of the application as language dependant code; and
    creating a source code structure for the application wherein the user interface code is maintained separately from non user interface code.

21. The article of manufacture of claim 19 wherein the base language is English.

22. The article of manufacture of claim 19 wherein pseudo localization includes adding a prefix to each translatable string in the application.

23. The article of manufacture of claim 19 wherein the at least one language different from the base language is selected from the group consisting of: German, Spanish, French, Japanese, Danish, Dutch, Italian, Portuguese, Swedish, Chinese, Korean, Czech, Finnish, Greek, and Hebrew.

24. The article of manufacture of claim 19 wherein the localization of the base version of the application comprises a localization of the second stage concurrently with an internationalization of the third stage.

25. The article of manufacture of claim 19 wherein the internationalization of the base version of the application comprises adapting the base version of the application to be capable of being localized in a variety of locales.

26. The article of manufacture of claim 19 wherein the base glossary comprises a glossary for the language dependent code, translated into at least one language different from the base language.

27. The article of manufacture of claim 19 wherein the language dependant code of the base version of the application is maintained separately from the language independent code of the base version of the application.

28. The article of manufacture of claim 19 wherein the operations further comprise:
    modifying the base version of the application, wherein the modifying is performed in response to at least one of: the internationalization of the base version of the application or the localization of the base version of the application.

29. A server comprising:
a memory; and
a processor, coupled to the memory, and configured to execute a set of instructions stored in the memory, wherein
the instructions are configured to cause the processor to facilitate an internationalization of a base version of an application,
the base version of the application comprises language dependant code and language independent code,
the base version of the application comprises a first stage, a second stage, and a third stage,
the internationalization of the base version of the application comprises pseudo localization of the language dependent code of the base version of the application,
the internationalization of the base version of the application comprises an internationalization of the second stage among a plurality of stages of the base version of the application,
the internationalization of the second stage is performed concurrently with the developing of the third stage,
the instructions are configured to cause the processor to facilitate a localization of the base version of the application,
the localization comprises generating a base glossary,
the localization of the base version of the application comprises a localization of the first stage, and
the localization of the first stage is performed concurrently with the internationalization of the second stage.

30. The server of claim 29 wherein the localization of the base version of the application comprises a localization of the second stage concurrently with an internationalization of the third stage.

31. The server of claim 29 wherein the internationalization of the base version of the application comprises adapting the base version of the application to be capable of being localized in a variety of locales.

32. The server of claim 29 wherein the base glossary comprises a glossary for the language dependent code, translated into at least one language different from the base language.

33. The server of claim 29 wherein the language dependant code of the base version of the application is stored separately from the language independent code of the base version of the application.

34. The server of claim 29 wherein the instructions are further configured to cause the processor to:
modify the base version of the application, in response to at least one of the internationalization of the base version of the application or the localization of the base version of the application.

35. A method comprising:
storing a first set of language dependent code in a memory, wherein
the memory comprises one or more data storage devices,
the first set of language dependent code comprises code for a user interface of a first development stage of a computer-implemented application, and
the first set of language dependent code comprises first content in a base language,
storing first set of language independent code in the memory, wherein
the first set of language independent code comprises code for the first development stage of the computer-implemented application,
modifying the first set of language dependent code, wherein
the modifying the first set of language dependent code comprises generating an internationalized version of the first set of language dependent code,
the internationalized version of the first set of language dependent code comprises the first content in the base language, and
indicators of the first content in the base language;
modifying the internationalized version of the first set of language dependent code, wherein
the modifying the internationalized version of the first set of language dependent code comprises generating a plurality of target-language versions of the first set of language dependent code,
each target-language version of the first set of language dependent code comprises translations into a corresponding target language of the first content in the base language, and
the modifying the internationalized version of the first set of language dependent code comprises generating a base glossary for each of the target languages;
storing a second set of language dependent code in the memory, wherein
the second set of language dependent code comprises code for a user interface of a second development stage of the computer-implemented application,
the second set of language dependent code comprises second content in the base language, and
the storing the second set of language dependent code is performed only after commencement of the modifying the first set of language dependent code;
modifying the second set of language dependent code, wherein
the modifying the second set of language dependent code comprises generating an internationalized version of the second set of language dependent code,
the internationalized version of the second set of language dependent code comprises
the second content in the base language, and
indicators of the second content in the base language;
storing a third set of language dependent code in the memory, wherein
the third set of language dependent code comprises code for a user interface of a third development stage of the computer-implemented application,
the third set of language dependent code comprises third content in the base language, and
the storing the third set of language dependent code is performed only after commencement of the modifying the internationalized version of the first set of language dependent code.

36. The method of claim 35, wherein:
the storing the third set of language dependent code is performed only after commencement of the modifying the second set of language dependent code.

* * * * *

UNITED STATES PATENT AND TRADEMARK OFFICE
CERTIFICATE OF CORRECTION

PATENT NO. : 7,761,288 B2
APPLICATION NO. : 09/845785
DATED : July 20, 2010
INVENTOR(S) : Karen P. Parnell et al.

It is certified that error appears in the above-identified patent and that said Letters Patent is hereby corrected as shown below:

In column 2, line 62, before "means" delete "a".

In column 3, line 22, delete "filly" and insert -- fully --, therefor.

In column 9, line 43, delete "multibyte" and insert -- multi-byte --, therefor.

In column 11, line 22, delete "abase" and insert -- a base --, therefor.

Signed and Sealed this
Twenty-sixth Day of April, 2011

David J. Kappos
*Director of the United States Patent and Trademark Office*